US005844220A

United States Patent [19]

Eddy et al.

[11] Patent Number: 5,844,220

[45] Date of Patent: Dec. 1, 1998

[54] APPARATUS AND METHOD FOR ELECTRONIC DEBITING OF FUNDS FROM A POSTAGE METER

[75] Inventors: Eileen C. Eddy, Stamford; Dale A. French, Clinton; Iris E. Kishimoto, Norwalk, all of Conn.

[73] Assignee: Pitney Bowes Inc., Stamford, Conn.

[21] Appl. No.: 701,946

[22] Filed: Aug. 23, 1996

[51] Int. Cl.[6] .......... G06F 7/08

[52] U.S. Cl. .......... 235/381; 364/464.02

[58] Field of Search .......... 364/464.02, 464.03; 380/21, 23, 25, 48; 235/381, 382.5, 375, 380, 382, 379; 902/5, 42; 379/97

[56] References Cited

U.S. PATENT DOCUMENTS

| | | | |
|---|---|---|---|
| 4,097,923 | 6/1978 | Eckert, Jr. et al. | 364/900 |
| 4,376,299 | 3/1983 | Rivest | 364/900 |
| 4,447,890 | 5/1984 | Duwel et al. | 364/900 |
| 4,614,861 | 9/1986 | Pavlov et al. | 235/380 |
| 4,725,718 | 2/1988 | Sansone et al. . | |
| 4,743,747 | 5/1988 | Fougere et al. . | |
| 4,760,532 | 7/1988 | Sansone et al. . | |
| 4,760,534 | 7/1988 | Fougere et al. . | |
| 4,787,045 | 11/1988 | Storace et al. | 364/464.02 |
| 4,853,865 | 8/1989 | Sansone et al. . | |
| 4,853,869 | 8/1989 | Durst et al. . | |
| 4,864,506 | 9/1989 | Storace | 364/464.02 |
| 4,907,162 | 3/1990 | Fougere et al. . | |
| 4,907,271 | 3/1990 | Gilham | 380/25 |
| 4,934,846 | 6/1990 | Gilham | 400/104 |
| 4,998,203 | 3/1991 | DiGiulio et al. | 364/464.02 |
| 5,077,792 | 12/1991 | Herring | 380/24 |
| 5,202,914 | 4/1993 | Kim et al. | 379/97 |
| 5,224,046 | 6/1993 | Kim et al. | 364/464.02 |
| 5,352,876 | 10/1994 | Watanabe et al. | 235/381 |
| 5,359,359 | 10/1994 | Dietrich et al. | 346/143 |
| 5,513,112 | 4/1996 | Herring et al. | 364/464.02 |
| 5,590,198 | 12/1996 | Lee et al. | 380/21 |
| 5,638,442 | 6/1997 | Gargiulo et al. | 380/21 |

*Primary Examiner*—Thien Minh Le

*Attorney, Agent, or Firm*—Steven J. Shapiro; Melvin J. Scolnick

[57] ABSTRACT

A method for remotely removing funds from a postage meter includes the steps of establishing communication between the postage meter and a remotely located data center; sending current postage meter accounting register readings to the data center; validating at the data center the current postage meter accounting register readings; sending, from the data center to the postage meter, an instruction to debit the postage meter accounting registers by a predetermined amount without the postage meter dispensing an indication of value; effecting a funds refill process within the postage meter whereby remote refill keys within the postage meter are diversified.

8 Claims, 2 Drawing Sheets

APPARATUS AND METHOD FOR ELECTRONIC DEBITING OF FUNDS FROM A POSTAGE METER

BACKGROUND OF THE INVENTION

This invention relates to a system for removing funds from a postage meter and more particularly to a system for remotely and securely removing funds from a postage meter.

Traditional postage meters are used in lieu of stamps to provide an indication of value on a mailpiece. The traditional postage meters are charged with a predetermined amount of postage which is debited and accounted for by the postage meter by an amount associated with each individual postage transaction. Moreover, in order to preclude the customer from having to return the postage meter to the post office when additional funds need to be added to the postage meter it is well known in the art to recharge the postage meter, with new funds by placing the postage meter in electronic communication with a remote data center. The remote data center has an account number associated with the individual meter such that after a validation process between the data center and the meter, the data center securely initiates updating of the postage funds in the meter. However, in the situation where it is desirable to withdraw funds from the postage meter, it is required that a customer service representative (CSR) be sent to the customer site. A request for withdrawal of postage funds could, for example, be initiated by the customer when they no longer wish to utilize the postage meter and they want a credit for the amount of funds remaining in the postage meter. The CSR, uses specialized control codes to withdraw the funds from the meter. The specialized control codes remove the funds from the meter by zeroing all of the current meter registers. The CSR then takes the meter to a post office where paperwork is completed in order to withdraw the meter from service. This activity results in the meter entering an inactive state with the amount of the withdrawn funds being reimbursed to the customer by the post office. The CSR then returns the meter to the meter manufacturer so that it can be reinitialized and synchronized with the data center for subsequent use by another customer.

The procedure outlined above is costly and time consuming both for the meter manufacturer and the post office since it requires a customer visit as well as “counter-time” spent at the post office doing paperwork. There can also be a delay in the process since a CSR representative must arrange for the visit to the customer site.

SUMMARY OF THE INVENTION

It is an object of the invention to provide a method and apparatus for the remote electronic debiting of funds from a postage meter.

This object is met by a method for remotely removing funds from a postage meter includes the steps of establishing communication between the postage meter and a remotely located data center; sending current postage meter accounting register readings to the data center; validating at the data center the current postage meter accounting register readings; sending, from the data center to the postage meter, an instruction to debit the postage meter accounting registers by a predetermined amount without the postage meter dispensing an indication of value; effecting a funds refill process within the postage meter whereby remote refill keys within the postage meter are diversified. An apparatus incorporates the method.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention

DETAILED DESCRIPTION OF THE PREFERRED EMBODIMENTS

Figure 1:
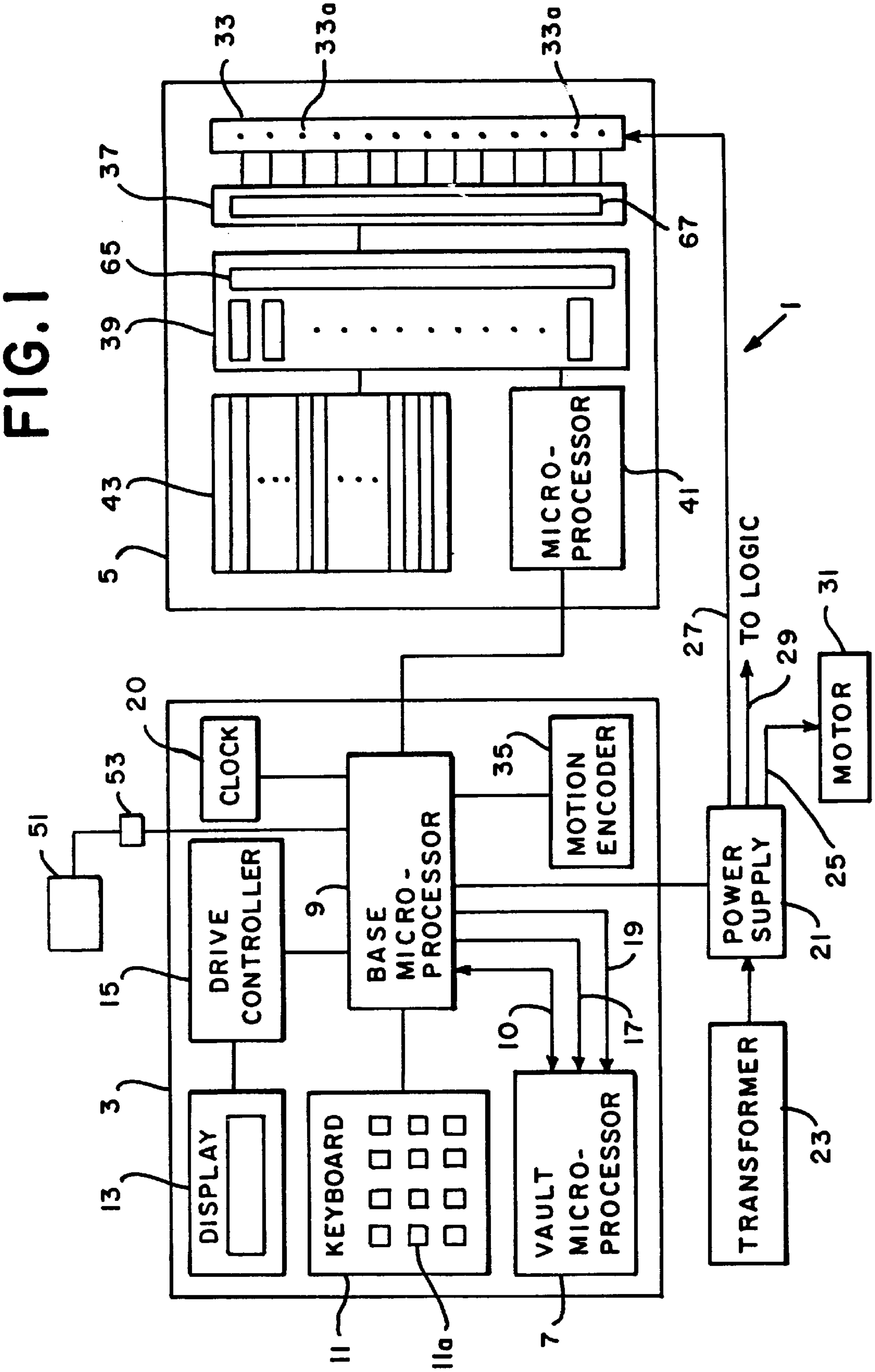
FIG. 1 is an electrical block diagram of a postage meter incorporating the inventive method.

FIG. 1 shows a schematic representation of a postage meter 1 implementing the inventive process. Postage meter 1 includes two primary modules, a base module 3 and a printhead module 5. Base module 3 includes a vault microprocessor 7, which can be fixed within the base or be mounted on a card which is removable from the base and commonly referred to as a smartcard, and a transaction or base microprocessor 9. Vault microprocessor 7 has software and associated memory to perform the accounting functions of postage meter 1. That is, vault microprocessor 7 has the capability to have downloaded therein, either locally or remotely, in a conventional manner a predetermined amount of postage funds. During each postage transaction, vault microprocessor 7 checks to see if sufficient funds are available. If sufficient funds are available, vault microprocessor 7 debits the amount from a descending register, adds the amount to an ascending register, and sends the postage amount to the printhead module 5 via the transaction microprocessor 9. Transaction microprocessor 9 also sends the date data to the printhead module 5 so that a complete postal indicia image can be printed.

Vault microprocessor 7 thus manages the postage funds with the ascending register representing the lifetime amount of postage funds spent, the descending register representing the amount of funds currently available, and a control sum register showing the running total amount of funds which have been credited to vault microprocessor 7. Additional features of vault microprocessor 7 which can be included are a piece counter register, encryption algorithms for encoding the information sent to the printhead module 5, and software for requiring a user to input a personal identification number which must be verified by the vault microprocessor 7 prior its authorizing a postage transaction.

Transaction microprocessor 9 acts as a message coordinator in coordinating and assisting in the transfer of information along data line 10 between the vault microprocessor 7 and the printhead module 5, as well as coordinating various support functions necessary to complete the metering function. Transaction microprocessor 9 interacts with keyboard 11 to transfer user information input through keyboard keys 11*a* (such as PIN number, postage amount) to the vault microprocessor 7. Additionally, transaction microprocessor 9 sends data to a liquid crystal display 13 via a driver/controller 15 for the purpose of displaying user inputs or for prompting the user for additional inputs. Moreover, base microprocessor 9 provides power and a reset signal to vault microprocessor 7 via respective lines 17, 19. A clock 20 provides date and time information to transaction microprocessor 9. Alternatively, clock 20 can be eliminated and the clock function can be accomplished by the base microprocessor 9.

Postage meter 1 also includes a conventional power supply 21 which conditions raw A.C. voltages from a wall mounted transformer 23 to provide the required regulated and unregulated D.C. voltages for the postage meter 1. Voltages are output via lines 25, 27, and 29 to a printhead motor 31, printhead 33 and all logic circuits. Motor 31 is used to control the movement of the printhead relative to the mailpiece upon which an indicia is to be printed. Base microprocessor 9 controls the supply of power to motor 31 to ensure the proper starting and stopping of printhead 33 movement after vault microprocessor 7 authorizes a transaction.

Base module 3 also includes a motion encoder 35 that processes the movement of the printhead motor 31 so that the exact position of printhead 33 can be determined. Signals from motion encoder 35 are sent to printhead module 5 to coordinate the energizing of individual printhead elements 33*a* in printhead 33 with the positioning of printhead 33. Alternatively, motion encoder 35 can be eliminated and the pulses applied to stepper motor 31 can be counted to determine the location of printhead 33 and to coordinate energizing of printhead elements 33*a*.

Printhead module 5 includes printhead 33, a printhead driver 37, a drawing engine 39 (which can be a microprocessor or an Application Specific Integrated Circuit (ASIC)), a microprocessor 41 and a non-volatile memory 43. NVM 43 has stored therein image data of the fixed indicia and image data for each individual font that can be required as part of the variable data. Microprocessor 41 receives a print command, postage amount, and date via the transaction microprocessor 9. The postage amount and date are sent from microprocessor 41 to the drawing engine 39 which then accesses non-volatile memory 43 to obtain image data therefrom which is then downloaded by the drawing engine 39 to the printhead driver 37 in order to energize individual printhead elements 33*a* to produce a single column dot pattern of the indicia. The individual column-by-column generation of the indicia is synchronized with movement of printhead 33 until the full indicia is produced.

Figure 2:
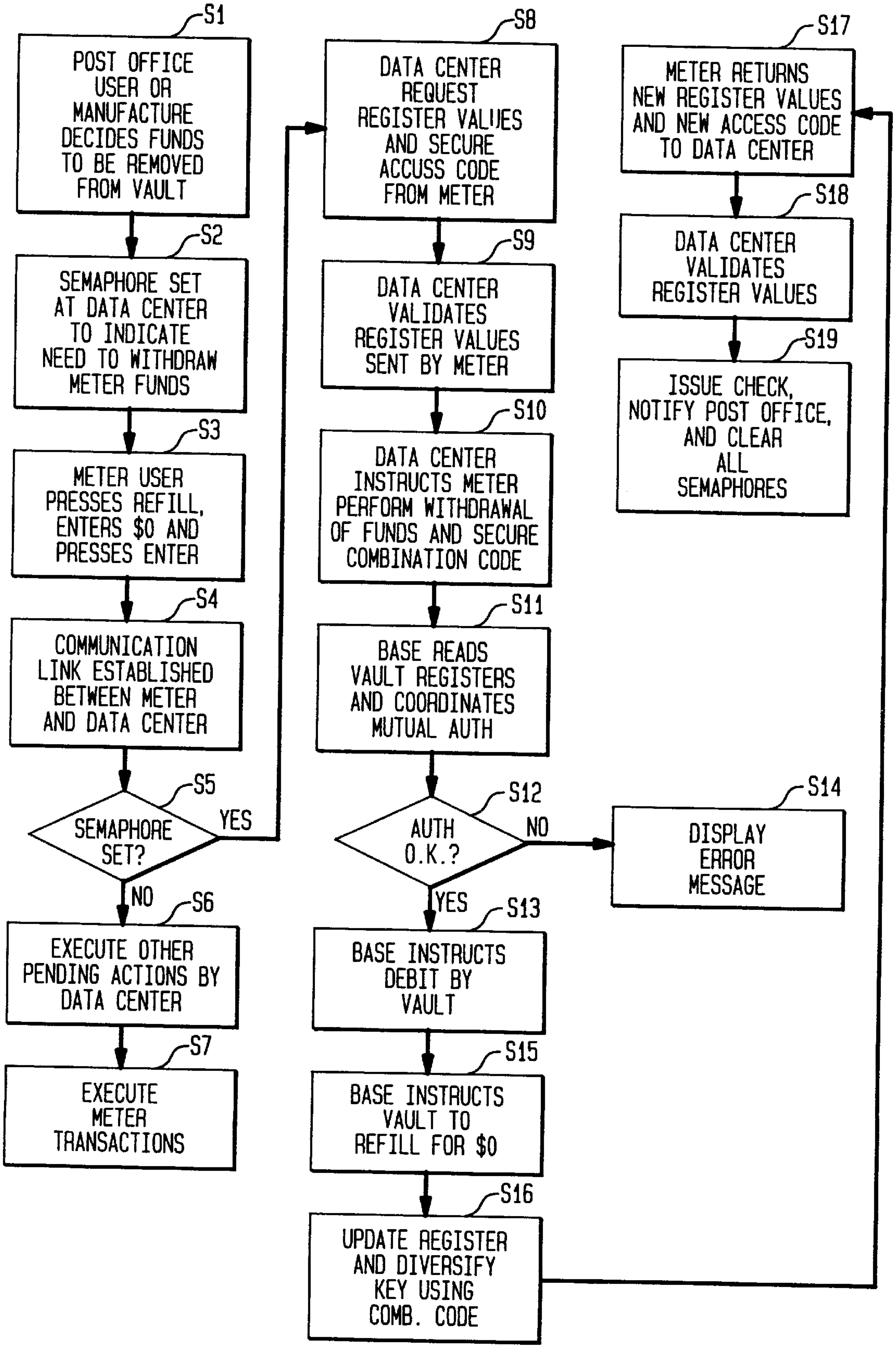
FIG. 2 is a flowchart of the inventive method.

Referring to FIGS. 1 and 2, the inventive procedure implemented in postage meter 1 to accomplish remote debiting of funds from a postage meter will be described. In step S1, the customer, meter manufacturer, or postal authority decides that funds should be removed from vault microprocessor 7. Data center 51 is notified that such is the case and a semaphore is set at the data center 51 (S2) to indicate that postage funds need to be withdrawn from postage meter 1 upon its next communication with data center 51. The customer has also been informed that during the next postage meter refill process the postage funds will be withdrawn. Thus, the customer presses a refill button and the meter prompts the customer as to what the amount of the refill will be. In this case, since the process is being initiated for funds withdrawal, the user would enter zero dollars (S3). Postage meter 1 via base microprocessor 9 then establishes communication with the remote data center 51 via telephone modem 53 utilizing a conventional technique which involves postage meter 1 sending its serial number and account number to the data center 51. Accordingly, when the communication link is established (S4) between postage meter 1 and data center 51, data center 51 will check to see if funds should be debited by determining if the previously set semaphore has been set (S5). If it has not, the data center 51 checks for other pending actions (S6) that it is required to perform. Subsequent to the data center 51 completing its other pending transactions, it will query postage meter 1 as to whether there are any transactions postage meter 1 needs to initiate. If so, postage meter 1 will process any of its pending transactions, such as the transfer of inspection data, refill requests and so forth (S8). If the semaphore is set however, the data center 51 commences the funds withdrawal process by requesting that postage meter 1 send its current register values, such as the descending register and control sum values, together with a secure access code that is generated by the meter based on data therein and a variable secure key stored in vault microprocessor 7 (S8). The details of remote refilling and the generation and use of the secure access code is known in the art and described in U.S. Pat. Nos., 4,736,299; 4,447,890; 4,864,506; 4,874,045; and 4,097,923, all of which are incorporated herein by reference. The secure access code is used by the data center 51 to validate the register value information sent by postage meter 1. That is, data center 51 receives the register readings and regenerates the secure access code itself. If the secure access code generated by the data center 51 matches that sent by the postage meter, the register data has been validated (S9). If however, the register data is not validated by data center 51, an error code is issued to postage meter 1, and postage meter 1 will disconnect itself from data center 51 and display an error message to the customer via display 13. If however, the register readings are validated, data center 51 will issue a request to withdraw all or a portion of funds that are in vault microprocessor 7 descending register (S10). Along with the withdrawal of funds request, data center 51 issues a secure combination code to postage meter 1. Postage meter 1 uses the combination code to effect the diversification of its variable secure key.

Upon receipt of the instruction from data center 51 to debit funds from the descending register and the combination code, postage meter 1 through base microprocessor 9 reads vault microprocessor 7 accounting registers. Base microprocessor 9 then coordinates a mutual authentication procedure (s11) between vault microprocessor 7 and printhead module microprocessor 41 in a manner fully described in copending application Ser. No. o8/579,507, filed Dec. 27, 1995 and entitled METHOD AND APPARATUS FOR SECURELY AUTHORIZING PERFORMANCE OF A FUNCTION IN A DISTRIBUTED SYSTEM SUCH AS A POSTAGE METER, which is hereby incorporated by reference. If the mutual authentication process is successfully completed (S12), base microprocessor 9 instructs vault microprocessor 7 to debit its descending register by a value as instructed by the data center. In the case where a complete withdrawal of funds is being requested, this would be the total value in the descending register (13). In the event that the mutual authentication procedure is not successfully completed an error message is displayed via display 13 which states that they debit has been aborted (S14). It is to be noted that subsequent to step 13, in an actual postage transaction where the descending register is debited by the postal transaction amount, vault microprocessor 7 would normally send a debit certificate to printhead module microprocessor 41 which in turn would initiate printing of the postage indicia which indicates the amount of the postage transaction. However, in the situation where funds withdrawal is taking place, no such printing of a postage indicia occurs. That is, the debit certificate and the print postage signal are never sent from the vault microprocessor 7 to the vault microprocessor 41. However, in a preferred embodiment, the system could be modified so that upon withdrawal of the funds from the descending register, the postage meter print module 5 could be activated to print a withdrawal receipt in lieu of a postage indicia.

Subsequent to the withdrawal of funds from the descending register, base microprocessor 9 instructs vault microprocessor 7 to perform a funds refill for zero dollars using the secure combination code received from the data center 51 (S15). The vault microprocessor 7 updates the descending register by the refill amount as well as the ascending register, the control sum, and the piece count, and changes the variable secure key stored in the vault microprocessor using the secure combination code received from the data center 51 (S16). Next, postage meter 1 issues the updated register values and new access code (based on the new key) to the data center 51 for use by data center 51 in validating that the withdrawal of funds has been successfully executed (S17). Data center 51 validates the register readings based on the new access code in the same manner as previously discussed (S18). If the data center cannot validate the register values, data center 51 sends an error message which is displayed by display 13 and postage meter is disconnected from the data center 51

In the event that the data center 51 validates the register values, the data center 51 will issue a check for the amount withdrawn from the descending register, notify the post office of such transaction and clears all previously set semaphores (19).

One skilled in the art will recognize that the data center requires the same key information as the meter in order to validate the register values sent to the data center. Moreover, it is apparent from the description above that a major advantage of the invention is that when the zero refill is completed, the meter vault is synchronized with the data center 51 and ready for use by a new customer. That is, the keys and register values at the meter and base are consistent. In the prior process, all of the meter values were zeroed out. Additionally, the ascending register is always maintained so that its value represents that for the life of the meter and not just for the life of a single user.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed:

1. A method for remotely removing funds from a postage meter comprising the steps of:

establishing communication between the postage meter and a remotely located data center;

sending at least one current postage meter accounting register reading to the data center;

validating at the data center the current postage meter accounting register reading; sending, from the data center to the postage meter, an instruction to debit the at least one current postage meter accounting register by a predetermined amount without the postage meter dispensing an indication of value;

upon receipt of the instruction by the postage meter debiting the at least one current postage meter register by the predetermined amount without the postage meter dispensing an indication of value; and effecting a funds refill process within the postage meter whereby a variable secure key stored within the postage meter is diversified to have a new value.

2. A method as recited in claim 1 further comprising sending data having a predetermined relationship to the variable secure key from the postage meter to the data center for validating that debiting of the postage meter has occurred.

3. A method as recited in claim 2, further comprising printing the withdrawal receipt subsequent to debiting by the postage meter.

4. A method as recited in claim 1 further comprising sending first and second code postage meter accounting register readings to the data center and debiting the postage meter descending register by the predetermined amount without the postage meter dispensing an indication of value.

5. A method as recited in claim 4 wherein the predetermined amount is in value in the descending register.

6. A method as recited in claim 5 wherein subsequent to the effecting step the ascending register does not change such that it always reflects a total value added to the postage meter for its entire operational life.

7. A method as recited in claim 3 further comprising issuing a check for the predetermined amount subsequent to validating that debiting of the postage meter has occurred.

8. A postage dispensing system comprising:

a postage meter having a printing mechanism for printing and indication of value on a recording medium, at least one accounting register for maintaining the value of available postage in the postage meter, and a data center:

wherein the postage meter further comprises means for establishing communication between the postage meter and the remotely located data center, means for validating at the data center the current postage meter accounting register reading and means for sending, from the data center to the postage meter, an instruction, and means upon receipt of the instruction for debiting the postage meter accounting register by a predetermined amount without the postage meter dispensing and indication of value, and means for effecting a funds refill process within the postage meter whereby a variable secure key stored within the postage meter is diversified to having a new value.

* * * * *